US007294298B2

(12) United States Patent
Iijima

(10) Patent No.: US 7,294,298 B2
(45) Date of Patent: Nov. 13, 2007

(54) FUNCTIONAL FILM FOR TRANSFER HAVING FUNCTIONAL LAYER, OBJECT FURNISHED WITH FUNCTIONAL LAYER AND PROCESS FOR PRODUCING THE SAME

(75) Inventor: Tadayoshi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 47 days.

(21) Appl. No.: 10/521,780

(22) PCT Filed: Jul. 18, 2003

(86) PCT No.: PCT/JP03/09216

§ 371 (c)(1),
(2), (4) Date: Jan. 21, 2005

(87) PCT Pub. No.: WO2004/009352

PCT Pub. Date: Jan. 29, 2004

(65) Prior Publication Data

US 2006/0068134 A1 Mar. 30, 2006

(30) Foreign Application Priority Data

Jul. 24, 2002 (JP) ............................ 2002-214821

(51) Int. Cl.
*H01B 5/14* (2006.01)
*H01B 17/56* (2006.01)
*B32B 27/18* (2006.01)

(52) U.S. Cl. ...................... 264/112; 428/141; 428/328; 428/336; 428/343; 428/354; 428/421

(58) Field of Classification Search ................ 428/336, 428/328, 421, 141, 354, 343; 264/112
See application file for complete search history.

(56) References Cited

U.S. PATENT DOCUMENTS 6,797,210 B2 * 9/2004 Iijima ........................ 264/112

(Continued)

FOREIGN PATENT DOCUMENTS

EP 0 479 223 4/1992

(Continued)

OTHER PUBLICATIONS

Partial machine translations of JP-09-109259 (published Apr. 28, 1997), JP-06-103839 (published Apr. 15, 1994) and JP-08-199096 (published Aug. 6, 1996).*

*Primary Examiner*—Daniel Zirker
(74) *Attorney, Agent, or Firm*—Oblon, Spivak, McClelland, Maier & Neustadt, P.C.

(57) ABSTRACT

The present invention provides a functional film for transfer in order to furnish a surface of an article, even an article poor in flexibility, such as a board material, with a functional layer having a uniform thickness and a higher function, e.g. a transparent conductive layer having a lower electric resistance; an article furnished with the functional layer; and a method for producing the article furnished with the functional layer. A functional film for transfer comprising at least a functional layer 4 on a support 1, said functional layer 4 being releasable from the support 1, wherein the functional layer 4 is a compressed layer of functional fine particles, and further, on the functional layer 4 an adhesive layer 5 comprising at least an acrylic type monomer (M) and a silicone type resin (S) is provided. The functional film for transfer is stuck, through the adhesive layer 5, onto a surface of an object article to be furnished with the functional layer; the adhesive layer 5 is cured; the support 1 is released; and subsequently calcining is performed.

7 Claims, 4 Drawing Sheets

U.S. PATENT DOCUMENTS

| | | | |
|---|---|---|---|
| 2002/0037399 | A1 | 3/2002 | Tamai et al. |
| 2002/0051879 | A1 | 5/2002 | Tamai et al. |
| 2002/0086138 | A1 | 7/2002 | Iijima |

FOREIGN PATENT DOCUMENTS

| | | |
|---|---|---|
| EP | 0 917 964 | 5/1999 |
| EP | 0 982 150 | 3/2000 |
| EP | 1 097 977 | 5/2001 |
| JP | 6-103839 | 4/1994 |
| JP | 8-199096 | 8/1996 |
| JP | 11-302614 | 11/1999 |
| JP | 2001-328193 | 11/2001 |
| WO | 00/18848 | 4/2000 |
| WO | 01/87590 | 11/2001 |
| WO | 02/33017 | 4/2002 |

* cited by examiner

FUNCTIONAL FILM FOR TRANSFER HAVING FUNCTIONAL LAYER, OBJECT FURNISHED WITH FUNCTIONAL LAYER AND PROCESS FOR PRODUCING THE SAME

TECHNICAL FIELD

The present invention relates to a functional film for transfer having a functional layer comprising a compressed layer of functional fine particles on a support, an article provided with the functional layer, and a method for producing the article provided with the functional layer.

In the present invention, the functional film includes both a functional film and a functional sheet. In addition, the functional film of the present invention includes a functional film in which a support is a metal.

The functional layer is a layer having a function, and the function means an action accomplished through physical and/or chemical phenomena. The functional layer includes layers having various functions, such as a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer, a photocatalyst layer and others.

Particularly, the present invention relates to a functional film for transfer having a transparent conductive layer, an article provided with the transparent conductive layer, and a method for producing the article provided with the transparent conductive layer. The transparent conductive layer can be used as a transparent electrode such as a plasma display panel electrode, an electroluminescence panel electrode, an electrochromic element electrode, a liquid crystal electrode, a transparent plane heater, or a touch panel, and can be also used as a transparent electromagnetic-wave shielding layer.

BACKGROUND ART

Hitherto, functional layers made of various functional materials are produced by the physical vapor deposition method (PVD) such as vacuum vapor deposition, laser ablation, sputtering, or ion plating, or by the chemical vapor deposition method (CVD) such as heat CVD, light CVD, or plasma CVD. These generally require a large-scale apparatus, and among these, some are not suited for forming a layer of large area.

For example, with respect to a transparent conductive layer, the following description can be made. At present, the transparent conductive layer is produced mainly by the sputtering method. There are various modes for the sputtering method, for example, a method of forming a layer by allowing inert gas ions, which are generated by direct current or high-frequency discharge, to be accelerated to hit the surface of a target in vacuum so as to strike out atoms constituting the target from the surface for deposition on the substrate surface.

The sputtering method is excellent in that a conductive layer having a low surface electric resistance can be formed even if it has a large area to some extent. However, it has a disadvantage that the apparatus is large, and the layer forming speed is slow. If the conductive layer is to have a still larger area from now on, the apparatus will be further enlarged. This raises a technical problem such that the controlling precision must be heightened and, from another point of view, raises a problem of increase in the production cost. Further, although the number of targets is increased to raise the speed in order to compensate for the slowness of the layer forming speed, this also is a factor that enlarges the apparatus, thereby raising a problem.

An attempt is made to produce the transparent conductive layer by the application method. In a conventional application method, a conductive paint having conductive fine particles dispersed in a binder solution is applied onto a substrate, dried, and hardened to form the conductive layer. The application method has advantages in that a conductive layer having a large area can be easily formed, that the apparatus is simple and has a high productivity, and that the conductive layer can be produced at a lower cost than by the sputtering method. In the application method, an electric path is formed by contact of the conductive fine particles with each other, whereby the electric conductivity is exhibited. However, the conductive layer produced by the conventional application method has an insufficient contact, and the obtained conductive layer has a high electric resistance value (i.e. is inferior in conductivity), thereby limiting its usage.

As an application method using no binder resin, for example, Japanese Laid-open Patent Publication No. 8-199096 (1996) discloses a method in which a conductive layer forming paint comprising tin-doped indium oxide (ITO) powders, a solvent, a coupling agent and an organic or inorganic acid salt of metal, and not containing a binder is applied onto a glass plate and calcined at a temperature of 300° C. or higher. In this method, since the binder is not used, the conductive layer has a low electric resistance value.

Also, a process is known in which a layer is formed by application using the sol-gel method. An application method using the sol-gel method is suited for forming a layer of large area.

By any of the above-mentioned application methods, in the case that the support is one having flexibility such as a film, a functional layer having a large area can be easily formed, however, in the case that the support is one having poor flexibility such as a plate material, the application is difficult as compared with the case of the flexible support, and particularly it is difficult to control a layer thickness for uniformity. Namely, in the case of the flexible film, the application can be performed by fixing a coater section and moving the film, thereby easily controlling a layer thickness. On the other hand, in the case of the plate material having poor flexibility, although the application can be performed by moving the plate material if the application area is small, accuracy of the layer thickness is liable to deteriorate due to wobbling or others by moving the plate material if the application area is large. Also, although a method moving the coater section may be mentioned, accuracy of the layer thickness deteriorates if flatness of the plate material is poor.

Also, Japanese Laid-open Patent Publication No. 6-103839 (1994) discloses a method for manufacturing a transparent conductive substrate by transferring.

DISCLOSURE OF THE INVENTION

Object of the Invention

Thus, the inventor suggested, in WO 01/87590, a functional film for transfer having a functional layer capable of exhibiting various functions by an application method, for example, a transparent conductive layer low in electric resistance, in order to furnish an article poor in flexibility, such as a board material, with the functional layer which has a uniform thickness; an article furnished with the functional layer; and a method for producing the article furnished with the functional layer.

The inventor has further studied, and found out that a functional layer having a higher function, for example, a transparent conductive layer having a lower electric resistance can be formed on a surface of an article by using an adhesive layer having excellent adhesion performance even when the layer is subjected to high-temperature treatment and performing calcining after transfer.

An object of the present invention is to provide a functional film for transfer in order to furnish a surface of an article, even an article poor in flexibility, such as a board material, with a functional layer having a uniform thickness and a higher function; an article furnished with the functional layer; and a method for producing the article furnished with the functional layer.

In particular, an object of the present invention is to provide a conductive film for transfer in order to furnish a surface of an article, even an article poor in flexibility, such as a board material, with a transparent conductive layer having a uniform thickness and a lower electric resistance; an article furnished with the transparent conductive layer; and a method for producing the article furnished with the transparent conductive layer.

SUMMARY OF THE INVENTION

The present invention provides a functional film for transfer comprising at least a functional layer on a support, said functional layer being releasable from the support, wherein the functional layer is a compressed layer of functional fine particles, and further, on the functional layer an adhesive layer comprising at least an acrylic type monomer (M) and a silicone type resin (S) is provided. The support has flexibility.

In the functional film for transfer according to the present invention, the adhesive layer further comprises an acrylic type resin (P).

In the functional film for transfer according to the present invention, the adhesive layer comprises the acrylic type resin (P) and the acrylic type monomer (M) at a weight ratio P/M of 0/10 to 8/2, and comprises the silicone type resin (S) at a weight ratio of the silicone type resin (S) to the total (P+M) of the acrylic type resin (P) and the acrylic type monomer (M), S/(P+M), of 0.01/100 to 50,000/100.

In the functional film for transfer according to the present invention, the adhesive layer further comprises a photopolymerization initiator. In the functional film for transfer according to the present invention, the adhesive layer is cured by irradiation with active energy rays.

In the present invention, the term "releasable" includes a case as illustrated in FIG. 1.

FIG. 1(*a*) shows a mode of release used in a usual sense, which is a mode in which a layer A and a layer B, which contact each other, are completely released from the interface therebetween.

FIGS. 1(*b*) and 1(*c*) show a mode of release in which a layer A and a layer B, which contact each other, are released from the interface therebetween, but a part of one layer A remains on another layer B. The case that a complete release is not attained as shown in FIG. 1(*a*), when it is microscopically viewed, is intended as releasable provided that each of the layers after release substantially constitutes a layer. The case of the present invention includes a case in which a compressed layer of functional fine particles corresponds to the layer A in FIG. 1(*b*) or 1(*c*).

In the present invention, the phrase "a functional layer releasable from a support" means a state that the support and the functional layer can be released from each other. When the functional film for transfer according to the present invention is actually used, its support is released from its functional layer stuck through an adhesive layer on an object article in many cases.

In the functional film for transfer according to the present invention, one or more intermediate layers are provided on the support, and the functional layer is provided on the intermediate layer(s). The functional film for transfer usually has the intermediate layer(s) between the support and the functional layer.

The functional film for transfer according to the present invention includes two types dependent on whether or not the surface of the functional layer is exposed when the functional layer is transferred onto an object article to be transferred.

The following describes the functional film for transfer of the first type, wherein the surface of the functional layer is not exposed:

The film of the first type is the functional film wherein an intermediate layer releasable from the support is formed on the support, the compressed layer of the functional fine particles is formed on the releasable intermediate layer, and the releasable intermediate layer can be released together with the compressed layer of the functional fine particles from the support. When this functional film of the first type is used to transfer the functional layer on an object article to be transferred, the functional layer is transferred on a surface of the object article, and the releasable intermediate layer is present on the functional layer. The intermediate layer may become extinct at the time of calcining or may contain a component which is not extinguished by calcining. For example, in the case that the intermediate layer is made of a resin consisting of only an organic component, the layer becomes extinct at the time of calcining. However, in the case that the intermediate layer is made of a resin containing Si (silicon), siloxane bonds are formed by calcining. The layer can be applied to be made into a hard coat. In the functional film for transfer of the first type, the intermediate layer releasable from the support is not particularly limited as long as the layer is made to have a function as described above at the time of transfer.

The following describes the functional film for transfer of the second type, wherein the surface of the functional layer is exposed.

The film of the second type is the functional film for transfer wherein a base layer is formed on the support, the compressed layer of the functional fine particles is formed on the base layer, and the compressed layer of the functional fine particles can be released from the base layer.

The base layer is a layer which is not substantially released from the support at the time of transfer. In other words, the film of the second type is the functional film for transfer wherein an intermediate layer unreleasable from the support is formed on the support, the compressed layer of the functional fine particles is formed on the unreleasable intermediate layer, and the compressed layer of the functional fine particles can be released from the support and the unreleasable intermediate layer.

When this functional film of the second type is used to transfer the functional layer onto an object article to be transferred, the functional layer is transferred on a surface of the object article and the surface of the functional layer is exposed.

In the functional film for transfer of the second type, the base layer, that is, the unreleasable intermediate layer may be a resin layer made mainly of a resin.

In the functional film for transfer according to the present invention, the compressed layer of the functional fine particles is obtained by compressing a functional fine particle-containing layer, said functional fine particle-containing layer being formed by applying a liquid in which the functional fine particles are dispersed onto the support or an intermediate layer, and drying. In the functional film for transfer according to the present invention, the compressed layer of the functional fine particles is obtained by compressing at a compression force of 44 $N/mm^2$ or more.

When the functional film for transfer is produced, the dispersion liquid of the functional fine particles may contain a small amount of a resin, and it is particularly preferable that the dispersion liquid contains no resin. In the case that the dispersion liquid of the functional fine particles contains the resin, the content by volume of the resin is preferably less than 25 parts by volume with respect to 100 parts by volume of the functional fine particles.

In the functional film for transfer according to the present invention, the functional fine particles are conductive fine particles, and the compressed layer of the functional fine particles is a conductive layer. That is, the present invention also provides a conductive film for transfer. It is also preferable that the compressed layer of the functional fine particles is a transparent conductive layer.

The present invention also provides an article furnished with a functional layer, obtained by sticking any one of the functional films for transfer, through the adhesive layer of the film, onto a surface of an object article to be furnished with the functional layer, curing the adhesive layer after the sticking, releasing the support, and subsequently calcining. When the functional film for transfer of the second type is used, the article wherein the surface of the functional layer is exposed is directly obtained. In the present invention, the functional layer may be patterned.

The present invention also provides a method for producing an article furnished with a functional layer, characterized by: sticking any one of the functional films for transfer, through the adhesive layer of the film, onto a surface of an object article to be furnished with the functional layer; curing the adhesive layer after the sticking; releasing the support; and subsequently calcining.

The present invention also provides an article furnished with a conductive layer, produced by sticking the conductive film for transfer, through the adhesive layer of the film, onto a surface of an object article to be furnished with the conductive layer, curing the adhesive layer after the sticking, releasing the support, and subsequently calcining.

The present invention also provides a method for producing an article furnished with a conductive layer, characterized by: sticking the conductive film for transfer, through the adhesive layer of the film, onto a surface of an object article to be furnished with the conductive layer; curing the adhesive layer after the sticking; releasing the support; and subsequently calcining.

The present invention also relates to an article having an adhesive layer on a surface thereof, wherein a compressed layer of functional fine particles is provided on the adhesive layer, and the compressed layer is calcined. In the article according to the present invention, the adhesive layer contains silicon dioxide as a main component. As described above, this article furnished with the functional layer can be formed by use of the functional film for transfer according to the present invention wherein the adhesive layer is formed.

Further, the article furnished with the functional layer can also be formed, as a modified example, by use of the functional film for transfer having no adhesive layer.

That is, the present invention provides an article furnished with a functional layer, obtained by:

preparing a functional film for transfer comprising at least a functional layer on a support, said functional layer being releasable from the support and being a compressed layer of functional fine particles;

providing an adhesive layer comprising at least an acrylic type monomer (M) and a silicone type resin (S) beforehand on a surface of an object article to be furnished with the functional layer;

sticking the functional film for transfer, through the adhesive layer provided beforehand on the surface of the article, onto the surface of the article so as to position the support outside, curing the adhesive layer after the sticking, releasing the support, and subsequently calcining.

The present invention also provides a method for producing an article furnished with a functional layer, characterized by:

preparing a functional film for transfer comprising at least a functional layer on a support, said functional layer being releasable from the support and being a compressed layer of functional fine particles;

providing an adhesive layer comprising at least an acrylic type monomer (M) and a silicone type resin (S) beforehand on a surface of an object article to be furnished with the functional layer;

sticking the functional film for transfer, through the adhesive layer provided beforehand on the surface of the article, onto the surface of the article so as to position the support outside, curing the adhesive layer after the sticking, releasing the support, and subsequently calcining.

The present invention also provides an article furnished with a conductive layer, produced by preparing a conductive film for transfer comprising at least a conductive layer on a support which is releasable from the support wherein the conductive layer is a compressed layer of conductive fine particles;

providing an adhesive layer comprising at least an acrylic type monomer (M) and a silicone type resin (S) beforehand on a surface of an object article to be furnished with the conductive layer, sticking the conductive film for transfer, through the adhesive layer provided beforehand on the surface of the article, onto the surface of the article so as to position the support outside, curing the adhesive layer after the sticking, releasing the support, and subsequently calcining.

The present invention also provides a method for producing an article furnished with a conductive layer, characterized by: preparing a conductive film for transfer comprising at least a conductive layer on a support which is releasable from the support wherein the conductive layer is a compressed layer of conductive fine particles;

providing an adhesive layer comprising at least an acrylic type monomer (M) and a silicone type resin (S) beforehand on a surface of an object article to be furnished with the conductive layer;

sticking the conductive film for transfer, through the adhesive layer provided beforehand on the surface of the article, onto the surface of the article so as to position the support outside, curing the adhesive layer after the sticking, releasing the support, and subsequently calcining.

MODES FOR CARRYING OUT THE INVENTION

First, the functional film for transfer according to the present invention will be described.

Figure 1:
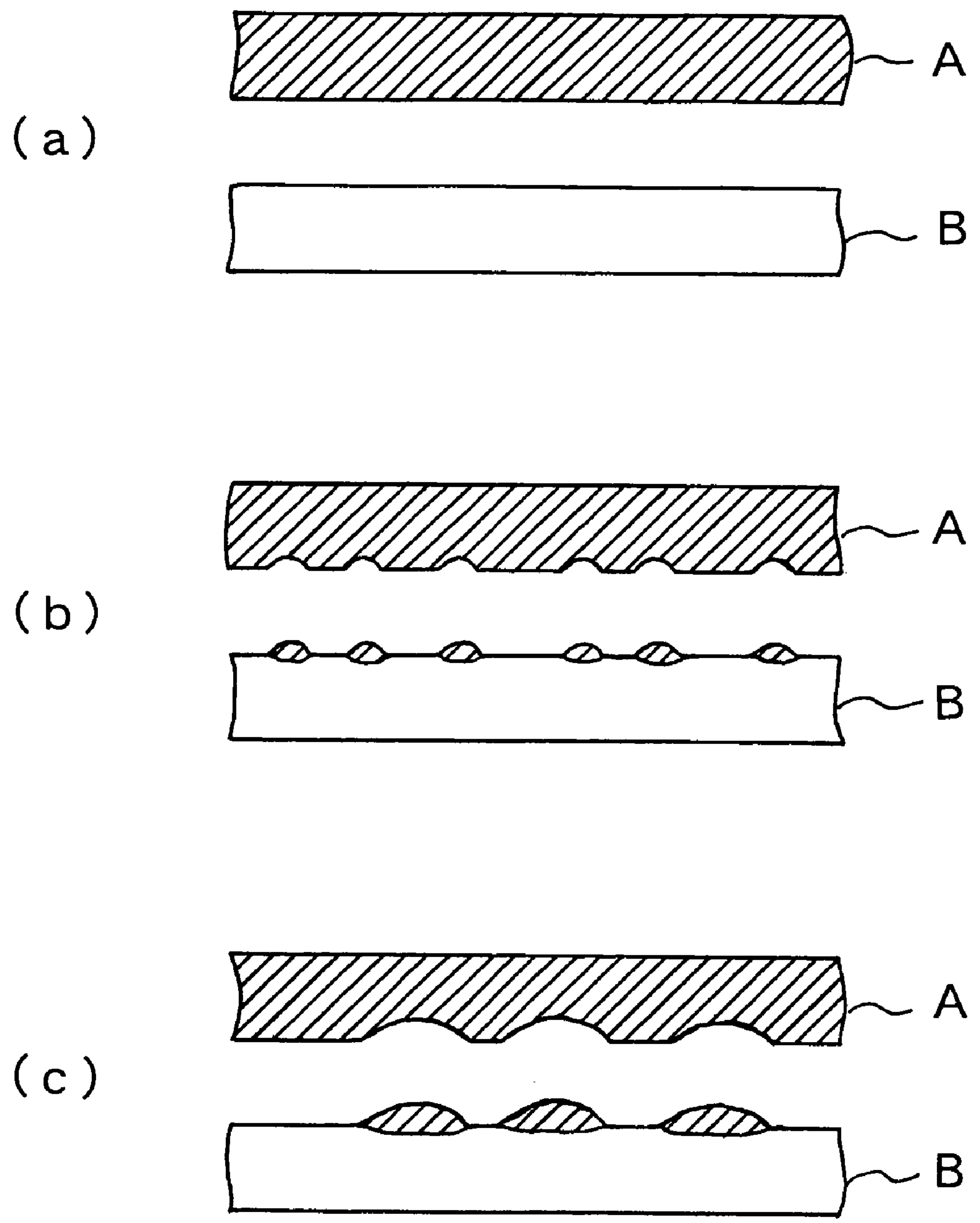
FIG. 1 is a view for describing modes of release.
Figure 2:
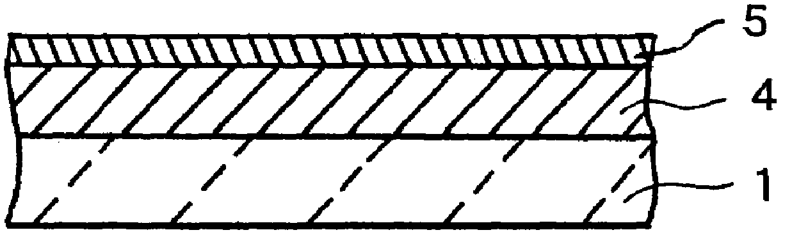
FIG. 2 is a cross-sectional view illustrating one example of the functional film for transfer in the present invention.
Figure 3:
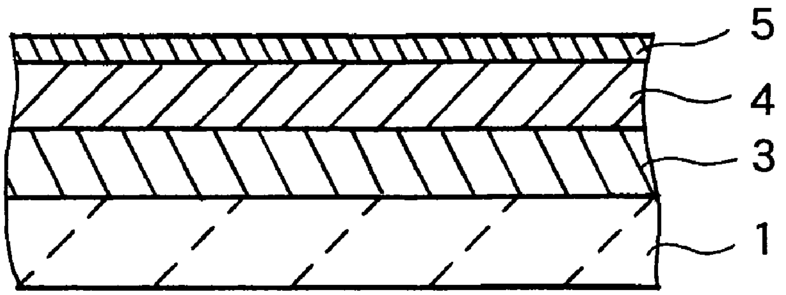
FIG. 3 is a cross-sectional view illustrating one example of the functional film for transfer in the present invention.

FIGS. 2 and 3 illustrate layer structure examples of the functional films for transfer of the first and second types of the present invention (hereinafter, simply referred to as functional films).

FIG. 2 is a cross-sectional view illustrating a layer structure example of a functional film wherein a functional layer (4) is formed on a support (1) and an adhesive layer (5) is formed on the functional layer (4).

FIG. 3 is a cross-sectional view illustrating a layer structure example of a functional film wherein a resin layer (3), a functional layer (4) and an adhesive layer (5) are formed, in this order, on a support (1). The resin layer (3) is a releasable intermediate layer in the first type, or is a base layer, that is, an unreleasable intermediate layer in the second type. In the first type, the surface of the support (1) on the resin layer (3) side is subjected to releasing treatment. At the time of transfer, the release occurs between the support (1) and the resin layer (3). In the second type, the close adhesive property between the support (1) and the resin layer (3) is high. Thus, at the time of transfer, the release occurs between the resin layer (3) and the functional layer (4).

In the present invention, the functional layer (4) is not particularly limited, and includes layers having various functions such as a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer, a photocatalyst layer and the like. Therefore, in the present invention, functional fine particles are used to constitute the aforesaid intended layers. The functional fine particles to be used are not particularly limited and may be mainly inorganic fine particles having an agglomeration force. In the present invention, in the production of any of the functional films, by applying a method for forming the films by application/compression as described below, a functional coating layer having a sufficient mechanical strength can be obtained, and the disadvantage, caused by a binder resin in the conventional application method that makes use of a large amount of the binder resin, can be eliminated. As a result, the intended function is further improved.

For example, in the production of a transparent conductive layer, conductive inorganic fine particles are used such as tin oxide, indium oxide, zinc oxide, cadmium oxide, antimony-doped tin oxide (ATO), fluorine-doped tin oxide (FTO), tin-doped indium oxide (ITO), aluminum-doped zinc oxide (AZO), or the like. In view of obtaining a more excellent conductivity, ITO is preferable. Alternatively, those in which the surface of fine particles such as barium sulfate having transparency is coated with an inorganic material such as ATO, ITO, or the like may be used. The particle diameter of these fine particles differs depending on the degree of scattering required in accordance with the usage of the conductive film, and may generally vary depending on the shape of the particles; however, it is generally 10 μm or less, preferably 1.0 μm or less, more preferably from 5 nm to 100 nm.

By application of this production method, an excellent conductivity is obtained. In the present invention, transparency means transmittance of visible light. With respect to the degree of scattering of light, desired level differs depending on the usage of the conductive layer. In the present invention, those generally referred to as being translucent and having a scattering are also included.

In the production of the ferromagnetic layer, iron oxide type magnetic powders such as $\gamma$-$Fe_2O_3$, $Fe_3O_4$, Co—$FeO_x$, Ba ferrite, etc., ferromagnetic alloy powders containing a ferromagnetic metal element such as $\alpha$-Fe, Fe—Co, Fe—Ni, Fe—Co—Ni, Co, Co—Ni, etc. as a major component, or the like is used. By application of this production method, the saturation magnetic flux density of the magnetic coating layer is improved.

In the production of the dielectric layer or the ferroelectric layer, dielectric or ferroelectric fine particles such as magnesium titanate type, barium titanate type, strontium titanate type, lead titanate type, lead titanate zirconate type (PZT), lead zirconate type, lanthanum-doped lead titanate zirconate type (PLZT), magnesium silicate type, a lead-containing perovskite compound, or the like are used. By application of this production method, dielectric properties or ferroelectric properties are improved.

In the production of a metal oxide layer that exhibits various functions, fine particles of metal oxide such as iron oxide ($Fe_2O_3$), silicon oxide ($SiO_2$), aluminum oxide ($Al_2O_3$), titanium dioxide ($TiO_2$), titanium oxide (TiO), zinc oxide (ZnO), zirconium oxide ($ZrO_2$), tungsten oxide ($WO_3$), or the like are used. By application of this production method, the filling density of metal oxide in the layer increases to improve various functions. For example, if $SiO_2$ or $Al_2O_3$ carrying a catalyst is used, a porous catalyst layer having a practicable strength is obtained. If $TiO_2$ is used, a photocatalyst function is improved. Further, if $WO_3$ is used, an improvement of chromophoric action in an electrochromic display element is obtained.

Further, in the production of the electroluminescent layer, fine particles of zinc sulfide (ZnS) are used. By application of this production method, an inexpensive electroluminescent layer can be produced by the application method.

In the present invention, a liquid in which functional fine particles selected from the above-mentioned various functional fine particles are dispersed therein is used as a functional paint in accordance with the objects. The functional paint is applied onto the support or an intermediate layer formed on the support and dried to form a layer containing the functional fine particles. Thereafter, the layer containing the functional fine particles is compressed to form a compressed layer of the functional fine particles, thereby to obtain the functional layer.

The liquid for dispersing the functional fine particles such as conductive fine particles or the like is not particularly limited, and various known liquids may be used. For example, as the liquid, saturated hydrocarbons such as hexane, aromatic hydrocarbons such as toluene and xylene, alcohols such as methanol, ethanol, propanol and butanol, ketones such as acetone, methyl ethyl ketone (MEK), methyl isobutyl ketone and diisobutyl ketone, esters such as ethyl acetate and butyl acetate, ethers such as tetrahydrofuran, dioxane and diethyl ether, amides such as N,N-dimethylformamide, N-methylpyrrolidone (NMP) and N,N-dimethylacetamide, halogenated hydrocarbons such as ethylene chloride and chlorobenzene, and others may be mentioned. Among these, liquids having a polarity are preferable, and in particular, alcohols such as methanol and ethanol, and amides such as NMP having an affinity with water are suitable because the dispersion is good without the use of a dispersant. These liquids can be used either alone or as a mixture of two or more kinds thereof. Further, a dispersant may be used depending on a kind of the liquid.

Also, water can be used as the liquid. If water is used as the liquid, the resin layer surface must be hydrophilic. The resin film and the resin layer are usually hydrophobic and are water-repellent, so that a uniform layer is not likely to be obtained. In the case described above, it is necessary to mix an alcohol with water or to make a hydrophilic surface of the resin layer by such a method as corona treatment.

The amount of the liquid to be used is not particularly limited, and may be such that the dispersion liquid of the fine particles has a viscosity suitable for application. For example, 100 to 100,000 parts by weight of the liquid is used with respect to 100 parts by weight of the fine particles. The amount of the liquid may be suitably selected in accordance with kinds of the fine particles and the liquid.

The dispersion of the fine particles into the liquid may be carried out by a known dispersion technique. For example, the dispersion is carried out by the sand grinder mill method. At the time of dispersion, use of a medium such as zirconia beads is also preferable in order to loosen the agglomeration of the fine particles. Further, at the time of dispersion, one must take care not to mix impurities such as dust.

It is preferable that the dispersion liquid of the fine particles does not contain a resin. In other words, the amount of the resin is preferably zero. In the conductive layer, if the resin is not used, the contact between the conductive fine particles is not inhibited by the resin, and the volume filling rate of the fine particles tends to be high. Therefore, the conductivity among the conductive fine particles is ensured, and the electric resistance value of the obtained conductive layer is low. The resin may be contained in an amount that does not deteriorate the filling properties; however, the amount is, for example, such an amount that the upper limit of the resin contained in the dispersion liquid is less than 25 parts by volume with respect to 100 parts by volume of the conductive fine particles as represented by volume before dispersion.

In the functional layers using $WO_3$ fine particles, $TiO_2$ fine particles or the like, if the resin is not used, the contact between the fine particles is not inhibited by the resin, so that an improvement is achieved in various functions. The resin may be contained in an amount that does not inhibit the contact between the fine particles and does not deteriorate the various functions; however, the amount is, for example, about 80 parts by volume or less with respect to 100 parts by volume of the respective fine particles.

Thus, for the functional layer it is preferable not to use the resin at the time of compression (namely, in the dispersion liquid of the functional fine particles); and even if the resin is used, it is preferably used in a small amount. The amount of the resin to be used may be suitably determined because the amount may vary to some extent depending on the object of the functional layer.

Various additives may be blended with the dispersion liquid of the fine particles within a range that satisfies the performance required in the function such as the conductivity or the catalyst action. For example, the additives such as an ultraviolet absorber, a surfactant, and a dispersant may be blended.

The support (1) is suitably a flexible resin film that is not cracked even if the compression force of the compression step is increased. The resin film is lightweight and can be easily handled. In the present invention, in the production of the functional film for transfer, since a pressing step at a high temperature or a calcining step is not carried out, the resin film may be used as the support.

As the resin film, for example, polyester film such as polyethylene terephthalate (PET), polyolefin film such as polyethylene and polypropylene, polycarbonate film, acrylic film, norbornene film (Arton manufactured by JSR Co., Ltd., or the like), and others may be mentioned. Besides the resin film, cloth, paper or others may be used as the support.

In the case of the functional film having the layer constitution of FIG. 2, a surface of the support (1) at the side where the functional layer (4) should be formed may be subjected to the release treatment, so that the formed functional layer (4) is in a state in which the functional layer (4) is releasable from the support (1). For example, a silicone releasing agent or the like may be applied onto the support surface.

In the case of the first type functional films having the layer constitution of FIG. 3, a surface of the support (1) at the side of the resin layer (3) may be subjected to the release treatment in accordance with affinity of resin materials being composed of the resin layer (3) with the support (1), so that the release occurs between the support (1) and the resin layer (3) at the time of transfer.

In the case of the second type functional film having the layer constitution of FIG. 3, it is preferable that the resin layer (3) has relatively high hardness, for example, pencil hardness of 2H or harder and 4H or softer, so that the release occurs between the resin layer (3) and the functional layer (4) at the time of transfer. It is also preferable that close adhesive properties between the support (1) and the resin layer (3) are high. For the resin layer (3) in the second type, relatively hard resins may be used, and as such resins, resins capable of obtaining relatively high hardness are used from acrylic resins, urethane resins, vinyl chloride resins, silicone resins or the like. The resin layer may contain fine particles such as silica for controlling hardness of the resin layer. After compression, the resin layer may be cured by heat, ultraviolet rays, or the like.

The resin of the resin layer (3) in the functional film of the first type and the second type is preferably insoluble into the liquid in which the functional fine particles are dispersed. In the conductive layer, if the resin layer is dissolved, the solution containing the resin comes around the conductive fine particles by capillary phenomenon, and the filling rate of the fine particles decrease. As a result, the electric resistance value of the obtained conductive layer is raised.

The dispersion liquid of the functional fine particles is applied onto the resin layer (3) or onto the support (1), and dried to form layers containing the functional fine particles such as layers containing the conductive fine particles.

Application of the dispersion liquid of the fine particles is not particularly limited, and may be carried out by a known method. For example, the application may be carried out by the application method such as the reverse roll method, the direct roll method, the blade method, the knife method, the extrusion nozzle method, the curtain method, the gravure roll method, the bar coat method, the dip method, the kiss coat method, the squeeze method, or the like. Further, the dispersion liquid may be allowed to adhere onto the resin layer or the support by atomizing, spraying, or the like.

The drying temperature is preferably about 10 to 150° C. although it depends on a kind of the liquid used for dispersion. If the temperature is lower than 10° C., condensation of moisture in air is liable to occur, whereas if it exceeds 150° C., the resin film support will be deformed. Also, at the time of drying, one must take care not to allow impurities to adhere to the surface of the fine particles.

The thickness of the layer containing the functional fine particles such as the layer containing the conductive fine particles after application and drying may be about 0.1 to 10 μm, though it depends on the compression condition in the next step or on the usage of the each functional film such as the conductive film finally obtained.

Thus, if the functional fine particles such as the conductive fine particles are dispersed in the liquid for application and drying, it is easy to form a uniform layer. If the dispersion liquid of the fine particles is applied and dried, the fine particles form a layer even if a binder is not present in the dispersion liquid. The reason why the layer is formed even in the absence of the binder is not necessarily clear; however, when the amount of the liquid decreases by drying, the fine particles gather by a capillary force. Further, it seems that, since they are the fine particles, the specific surface area is large and the agglomeration force is strong to form a layer. However, the strength of the layer at this stage is weak. Also, in the conductive layer, it has a high resistance value and has a large variation of the resistance value.

Next, the formed layer containing the functional fine particles such as the layer containing the conductive fine particles is compressed to obtain a compressed layer (4) of the functional fine particles such as the conductive fine particles. The compression improves the strength of the layer. Namely, the compression increases the number of contact points among the functional fine particles such as the conductive fine particles to increase the contact area. For this reason, the strength of the coating layer is increased. Since the fine particles are originally liable to be agglomerated, the compression makes a firm layer.

In the conductive layer, the strength of the coating layer increases and the electric resistance decreases. In the catalyst layer, the strength of the coating layer increases and the layer will be a porous layer, since the resin is not used or used in a small amount. Therefore, a higher catalyst function is obtained. In the other functional layers, the layer can be made into a layer having a high strength in which the fine particles are connected with each other, and also the filling amount of the fine particles per unit volume will be large, since the resin is not used or used in a small amount. For this reason, a higher function is obtained in each layer.

The compression is preferably carried out at a compression force of at least 44 $N/mm^2$. If it is carried out at a low pressure of less than 44 $N/mm^2$, the layer containing the functional fine particles such as the layer containing the conductive fine particles cannot be fully compressed and, for example, it is difficult to obtain a conductive layer being excellent in conductivity. A compression force of at least 135 $N/mm^2$ is more preferable, and a compression force of at least 180 $N/mm^2$ is still more preferable. According as the compression force is higher, the strength of the coating layer is improved, and the close adhesive properties between the functional layer and the support will be improved. In the conductive layer, a layer being more excellent in conductivity is obtained, the strength of the conductive layer is improved, and the close adhesive properties between the conductive layer and the resin layer will be firm. According as the compression force is raised, the pressure resistance of the apparatus must be raised, so that a compression force up to 1000 $N/mm^2$ is generally suitable.

Further, the compression is preferably carried out at such a temperature that the support is not deformed. If the support is the resin film, for example, it will be a temperature range below the glass transition temperature (secondary transition temperature) of the resin.

The compression is not particularly limited and may be carried out by sheet press or roll press; however, it is preferably carried out by means of a roll press machine. The roll press is a method in which the film to be compressed is sandwiched between rolls for compression and the rolls are rotated. The roll press is suitable because a high uniform pressure can be applied in the roll press, and the productivity of the roll press is higher than that of the sheet press.

The roll temperature of the roll press machine is preferably an ordinary temperature (an environment suitable for human work) from the viewpoint of productivity. If the compression is carried out in a heated atmosphere or with heated rolls (hot press), there will be a disadvantage such that the resin film is elongated when the compression pressure is increased. If the compression pressure is reduced in order to prevent the resin film from being elongated under heating, the mechanical strength of the coating layer decreases. In the conductive layer, the mechanical strength of the coating layer decreases and the electric resistance rises. It is also preferable to control the temperature so that the roll temperature may not rise by heat generation in the case where continuous compression is carried out by means of the roll press machine.

If there is a reason to reduce the adhesion of moisture to the fine particle surface as much as possible, the heated atmosphere may be adopted in order to reduce the relative humidity of the atmosphere; however, the temperature range is within a range such that the film is not easily elongated. Generally, it will be a temperature range below the glass transition temperature (secondary transition temperature). By taking the variation of humidity into account, it may be set at a temperature which is a little higher than the temperature that achieves the required humidity.

Here, the glass transition temperature of the resin film is determined by measuring the dynamic viscoelasticity, and refers to the temperature at which the dynamic loss of the main dispersion is at its peak. For example, with regard to PET film, its glass transition temperature is approximately around 110° C.

The roll of the roll press machine is preferably a metal roll because a strong pressure can be applied. Also, if the roll surface is soft, the fine particles may be transferred to the rolls at the compressing time, so that the roll surface is preferably treated with a hard film such as hard chromium, spraying film of ceramics, a film obtained by ionic plating of TiN, etc., DLC (diamond like carbon), or the like.

In this manner, the compressed layer (4) of the functional fine particles such as the conductive fine particles is formed. The thickness of the compressed layer of the functional fine particles such as the conductive fine particles may be about 0.1 to 10 μm, though it depends on the usage. Further, in order to obtain a thick compressed layer having a thickness of about 10 μm, a series of operations comprising application of the dispersion liquid of the fine particles, drying, and compression may be carried out repeatedly. Furthermore, in the present invention, it is of course possible to form the functional layers such as the conductive layer on both surfaces of the support.

In the functional films of the first type and the second type in the present invention, the compressed layer (4) of the functional fine particles may comprise at least two different compressed layers of functional fine particles.

In accordance with objects or usage of a multi-layer functional layer, multi-layer constitution may be accomplished by combining two or more functional layers having different functions. For example, the multi-layer functional layers for solar batteries, electroluminescent elements, electrochromic elements or the like may be obtained by combining two or more functional layers.

For the solar batteries, specifically, a multi-layer constitution comprising a transparent conductive layer, a transparent insulating layer, a semiconductive layer of chalcopyrite structure composed of groups I, III and IV elements, and a metal electrode in this order, is illustrated.

For distributed D.C. operating electroluminescent elements, multi-layer constitution comprising a transparent conductive layer, an EL emission layer, a rear electrode in this order, is illustrated.

For permeable electrochromic elements, multi layer constitution comprising a transparent conductive layer, a first chromophoric layer, a dielectric layer, a second chromophoric layer and a transparent conductive layer in this order, is illustrated.

Besides these, various multi-layer constitutions in accordance with various usages may be considered.

The multi-layer constitution is obtained by performing repeatedly a series of operations comprising applying a dispersion liquid of corresponding functional fine particles, drying and compressing. Each layer that constitutes the multi-layer functional layer is not necessarily a compressed layer. For example, in the case of the solar batteries, the transparent conductive layer, the transparent insulating layer and the semiconductive layer may be formed by compression and the metal electrode may be formed by vacuum deposition.

In the functional films for transfer of the first and second types of the present invention, an adhesive layer (5) is formed on the functional layer (4). The adhesive layer (5) is made of an adhesive composition comprising at least an acrylic type monomer (M) and a silicone type resin (S). The adhesive composition preferably contains an acrylic type resin (P) in order to give a good tackiness at an initial stage.

Since the adhesive layer comprises the acrylic type resin (P) and the acrylic type monomer (M), the adhesive layer can gain tacky feeling only by applying a solution of the adhesive composition and then drying the solution. Thus, the functional film for transfer can be certainly stuck onto a surface of an object article to be transferred. After the sticking, the adhesive layer is irradiated with active energy rays such as ultraviolet rays, so as to be cured. Thus, a hard cured layer is obtained. Consequently, the support of the functional film for transfer can easily be released. The acrylic type resin (P) preferably has a glass transition temperature Tg of 30° C. or higher. Since the adhesive layer comprises the silicone type resin (S), it is possible to keep sure adhesion of the functional layer onto the surface of the object article to be transferred on the basis of the adhesive layer made mainly of $SiO_2$ even after the acrylic type resin component in the cured layer is extinguished by calcining at high temperature after the support is released. The calcined adhesive layer in this case may be not necessarily a complete layer. For example, the calcined adhesive layer may be present thinly between the functional layer and the article.

In order to obtain good tackiness at the initial stage, hardness after curing, and excellent adhesion performance after calcining, it is preferable that the adhesive layer comprises the acrylic type resin (P) and the acrylic type monomer (M) as solid contents at a weight ratio P/M of 0/10 to 8/2 and comprises the silicone type resin (S) as a solid content at a weight ratio of the silicone type resin (S) to the total (P+M) of the acrylic type polymer (P) and the acrylic type monomer (M), i.e., a weight ratio S/(P+M) of 0.01/100 to 50,000/100. Since the acrylic type monomer (M) is a liquid at ambient temperature, only the silicone type resin (S) takes charge of the initial tackiness when the adhesive layer comprises no acrylic type resin (P). When the adhesive layer comprises the acrylic type resin (P), which is a solid at ambient temperature, the initial tackiness based on the acrylic type resin (P) is obtained. In order to obtain the initial tackiness based on the acrylic type resin (P), it is preferable that P/M is from 2/8 to 8/2. If the P/M is larger than 8/2, the initial tackiness tends to lower. If the P/M is smaller than 2/8, the viscosity of the adhesive composition solution becomes too low. Thus, when the film is stuck onto the article, inconveniences may be caused. If the S/(P+M) is smaller than 0.01/100, the adhesive performance after the adhesive layer is calcined tends to lower. If the S/(P+M) is larger than 50,000/100, the initial tackiness tends to get small. It is more preferable that the adhesive layer comprises the acrylic type resin (P) and the acrylic type monomer (M) at a weight ratio P/M of 2/8 to 8/2 and comprises the silicone type resin (S) at a weight ratio of the silicone type resin (S) to the total (P+M) of the acrylic type polymer (P) and the acrylic type monomer (M), i.e., a weight ratio S/(P+M) of 0.5/100 to 100/100.

As the acrylic type resin (P), a known resin may be used. Examples thereof include acrylic resins 103B and 1BR-305 (each of which is produced by Taisei Chemical Industries Ltd.). As the acrylic type monomer (M), a known monomer may be used. Examples thereof include tri- or more-functional acrylic type monomers such as KAYARAD GPO-303, KAYARAD TMPTA, and KAYARAD THE-330 (each of which are produced by Nippon Kayaku Co., Ltd.).

As the silicone type resin (S), known various resins, such as straight silicone, silicone acryl and silicone epoxy, may be used. Examples thereof include FRESCERA N (produced by Matsushita Electric Industrial Co., Ltd.) and TSR-144 (produced by GE Toshiba Silicones Co., Ltd.). A silicone resin is liquid in the state of varnish, but becomes a solid when solvent volatilizes. A silicone resin is generally nonvolatile, and is calcined, thereby becoming silicon dioxide or a silicon dioxide analogue having, in partial Si, organic residues. Since a silicone monomer is liquid and volatile, the monomer volatilizes during calcining. Thus, in the present invention, a silicone resin is used.

In the case that there are demands such that the close adhesive property between the object article to be furnished with the functional layer and the adhesive layer is made high at the time of transfer, a silicone monomer together with the silicone resin may be added to the adhesive layer.

Usually, the adhesive layer further comprises a photopolymerization initiator. As the photopolymerization initiator, various photopolymerization initiators may be used. Examples thereof include KAYACURE DETX-S (produced by Nippon Kayaku Co., Ltd.). The amount of the photopolymerization initiator may be set to about 0.01 to 20% by weight with respct to the total weight (P+M) of the acrylic type resin (P) and the acrylic type monomer (M). The adhesive layer is cured by irradiation with active energy rays such as ultraviolet rays, thereby improving the productivity when the functional film for transfer is stuck onto the object article. As the photopolymerization initiator, a known substance wherein a photopolymerization initiator is added to an acrylic type monomer may also be used. Examples of the substance, wherein a photopolymerization initiator is added to an acrylic type monomer, include ultraviolet curable resin SD-318 (produced by Dainippon Ink & Chemicals, Inc.) and XNR 5535 (produced by Nagese ChemteX Corp.).

If necessary, additives such as an ultraviolet absorbent and an infrared absorbent may be incorporated into the adhesive.

A releasable film may be given onto the adhesive layer (5) of the functional film for transfer according to the present invention in order to protect the surface of the adhesive layer up to the use thereof.

The formation of the adhesive layer (5) may be performed by applying a solution of the adhesive composition onto the functional layer (4). The adhesive layer (5) may be formed on the functional layer (4) by forming an adhesive layer on a separately-prepared support for release, which is subjected to release treatment, and then laminating to stick (closely adhere) so that the adhesive layer on the support for release and the functional layer (4) on the support (1) contact with each other. In this case, at the same time of the formation of the adhesive layer (5), the support for release is given on the adhesive layer to protect the surface of the adhesive layer up to the use time thereof. The functional layer (4) is impregnated with a part of the adhesive. The thickness of the adhesive layer, which depends on the tackiness of the adhesive, may be set to about 0.1 to 100 μm, more preferably about 1 to 20 μm before calcining.

In the present invention, it is also preferable that the compressed layer of the functional fine particles is subjected to heat treatment after formation of the compressed layer of the functional fine particles and before formation of the adhesive layer. By the heat treatment, internal stress remained in the resin layer at the forming time of the compressed layer is relaxed so that corrosion resistance of the functional film against various materials or various solvents is improved.

Conditions for the heat treatment may be suitably selected. For relaxation of the internal stress, a temperature of the heat treatment is preferably 50° C. or higher, more preferably 80° C. or higher. Upper limit of the temperature of the heat treatment is, for example, normally 130° C. in the case that the resin film is used as the support. Heat treatment time is also normally in a range of 1 minute to 100 hours, preferably in a range of 10 minutes to 50 hours, further preferably in a range of 30 minutes to 25 hours. An atmosphere at the time of the heat treatment may be an atmosphere under vacuum, reduced pressure, air, nitrogen gas or inert gas such as argon.

Next, an article provided with the functional layer in the present invention, and a method for producing the article will be described. Example of the layer constitution of an article provided with the functional layer (4) of the functional films of the first type and the second type described above in the present invention is shown in FIG. 4.

Figure 4:
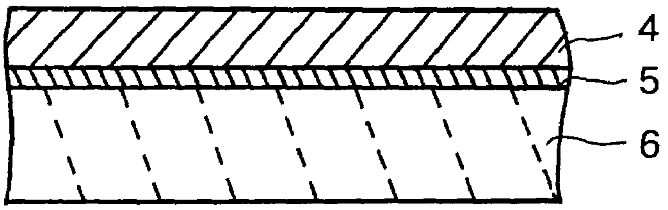
FIG. 4 is a cross-sectional view illustrating one example of the article provided with the functional layer in the present invention.

FIG. 4 is a cross-sectional view illustrating an example of the layer constitution in which the functional layer (4) is provided to a surface of the object article (6) through the adhesive layer (5). Namely, FIG. 4 illustrates an example in which the functional layer (4) is transferred using the functional film shown in FIG. 2, or using the second type functional film shown in FIG. 3.

In order to obtain the article provided with the functional layer of the present invention, first, the functional layer (4) of the functional film described above is transferred from the support (1) to the object article (6). Namely, the functional film is stuck onto a surface of the object article (6) through the adhesive layer (5) of the functional film so that the support (1) faces outside, thereafter, the adhesive layer (5) is cured preferably by irradiation of ultraviolet rays. Then, the support (1) of the functional film is released. After transfer, the calcining is performed to form a functional layer which reveals a higher function. At the time of transfer, the same adhesive as used in the adhesive layer (5) may be applied in advance onto a surface of the object article (6).

Figure 5:
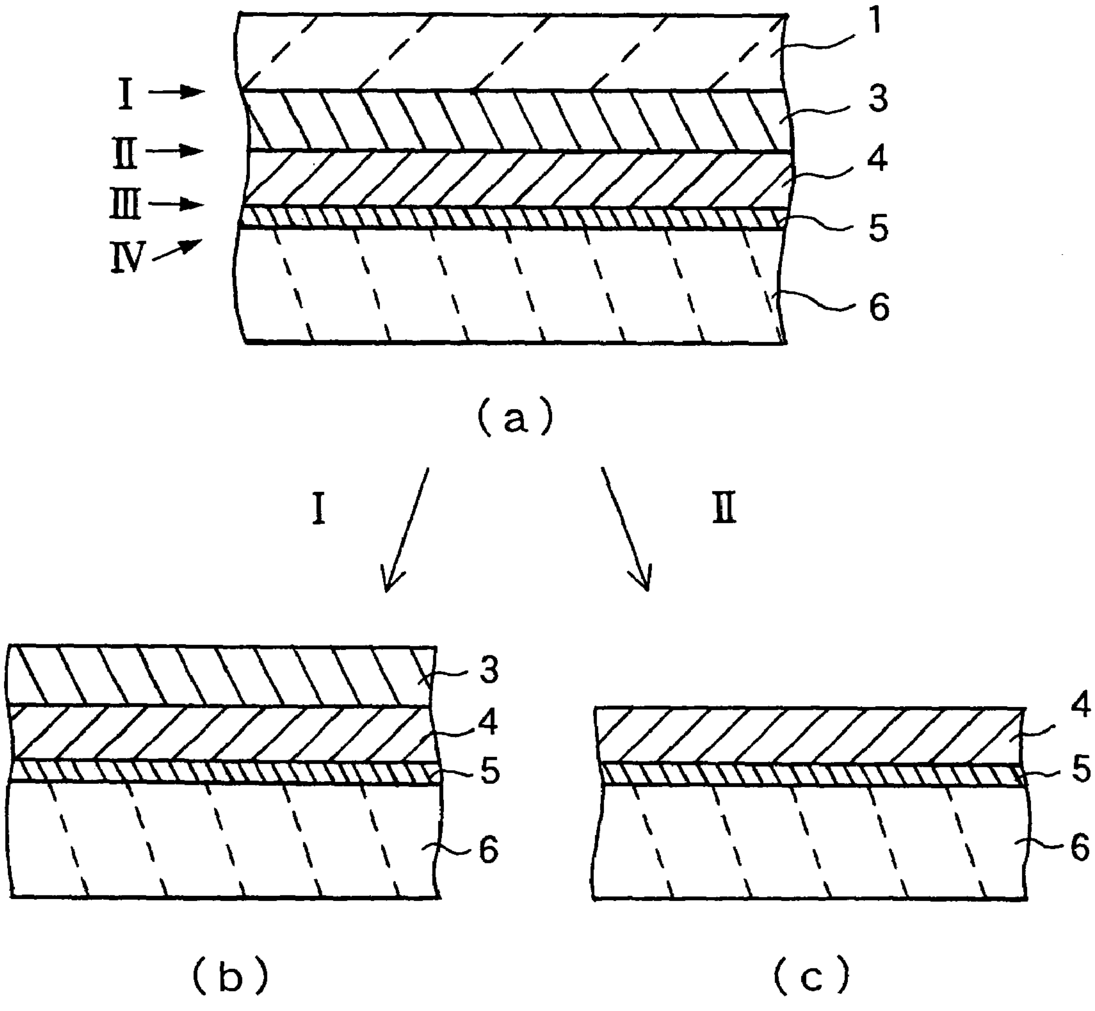
FIG. 5 is a view for describing release at the time of transfer using the functional film for transfer in the present invention.

FIG. 5 is a view for describing release at the time of transfer. In FIG. 5, (a) illustrates a state in which the functional film of the first type or the second type shown in FIG. 3 is stuck onto a surface of the transfer-object article (6). Here, in the present invention, the terms “releasable” and “not to be released” are used for representing behavior of the layers at the time of transferring to the object article as described below. Therefore, the terms do not mean absolute strength of adhesion.

Relationships of each layer in the present invention will be described referring to FIG. 5 as an example. Regarding close adhesion between the resin layer (3) and the functional layer (4), it seems that a part of the functional fine particles of the functional layer (4), which contact with the resin layer (3), is embedded in the resin layer (3) by compression, so that the functional layer (4) closely glues to the resin layer (3). Therefore, close adhesive properties of both layers (3) and (4) tend to be high in the case that compression force is high, and close adhesive properties of both layers (3) and (4) are high in the case that the resin layer (3) tends to be softer. The close adhesion force varies depending on the kind, shape, particle diameter, or others of the functional file particles, and also varies depending on presence or absence, the kind, or others of the resin contained in the layer of the functional fine particles at the time of compression.

In FIG. 5, an interface between the support (1) and the resin layer (3) (referred to as an interface I), an interface between the resin layer (3) and the functional layer (4) (referred to as an interface II), an interface between the functional layer (4) and the adhesive layer (5) (referred to as an interface III), and an interface between the adhesive layer (5) and the object article (6) (referred to as an interface IV) exist. In the present invention, the invention of the first type can be achieved by lowering the close adhesive properties at the interface I in comparing with the close adhesive properties at the other interfaces. Also, the invention of the second type can be achieved by lowering the close adhesive properties at the interface II in comparing with the close adhesive properties at the other interfaces.

In order to lower the close adhesive properties at the interface I in comparing the close adhesive properties at the other interfaces, close adhesive properties of the support (1) with the resin layer (3) may be lowered. Therefore, release treatment may be applied to a surface of the support (1) at the side of the resin layer (3), so that the release occurs between the support (1) and the resin layer (3) at the time of transfer. Further, the close adhesive properties at the other interfaces may be raised. In order to raise the close adhesive properties of the resin layer (3) with the functional layer (4), the resin layer may be relatively soft.

In order to lower the close adhesive properties at the interface II in comparing the close adhesive properties at the other interfaces, the close adhesive properties of the resin layer (3) with the functional layer (4) may be lowered. According as a hardness of the resin layer (3) is relatively high, the close adhesive properties of the compressed layer with the resin layer become lower. However, if the resin layer (3) is a layer being hard such as hard-coating, the close adhesive properties become too low. Generally, it is preferable that the resin layer (3) has relatively high hardness, for example, the pencil hardness of about 2H to 4H. Further, the close adhesive properties at the other interfaces may be raised. In order to raise the close adhesive properties of the support (1) with the resin layer (3), a surface of the support (1) may be subjected to the treatment for making adhesion easy (for example, corona treatment) to raise the close adhesive properties.

At the time of releasing the support (1), in the case of the first type functional film, the release occurs between the support (1) and the soft resin layer (3) (in FIG., an arrow I). The close adhesive properties of the functional layer (4) with the soft resin layer (3) are good, so that the release does not occur between the functional layer (4) and the resin layer (3). Therefore, as shown in (b), the functional layer (4) is provided to a surface of the object article (6) through the adhesive layer (5), so that the resin layer (3) exists on the functional layer (4).

By calcining after this transferring operation, the resin layer (3) becomes extinct in the case that the resin layer (3) is made of a resin comprising only organic components. In the case that the resin layer (3) is a resin comprising Si (silicon), siloxane bonds are formed by the calcining so that the resin layer (3) turns to a hard coat.

In the functional film of the second type, at the time of releasing the support (1), the close adhesive property between the functional layer (4) and the hard resin layer (3) is low so that the release occurs between the resin layer (3) and the functional layer (4) (an arrow 11 in the figure). As illustrated in (c), therefore, the functional layer (4) is given through the adhesive layer (5) onto the surface of the object article (6) and the surface of the functional layer (4) is in a state that the surface is exposed. By calcining (6) after this transferring operation, the article (6) furnished with the functional layer (4) is obtained. The functional film of the second type is suitable for the case that an exposed functional layer is desired to be provided onto an article surface.

The functional film of the first type or the second type may be produced mainly by selecting the raw material and the hardness of the resin layer (3).

The object article (6) is not particularly limited, and may be various articles which are not extinguished during calcining. Examples thereof include a board article or support poor in flexibility, on which a coating layer having a uniform thickness is not easily formed, and substances on which a compressed layer is not directly formed with ease, such as glass, ceramic or metal. For example, the surface of a CRT is desired to be subjected to treatments for antistatics, the shielding of electromagnetic waves, antireflection and others. CRTs are specific examples of the object article in the present invention.

When the functional layer is transferred, the object article to be transferred may be subjected to surface treatment in advance. In the case that the object article to be transferred is made of, for example, glass, the surface thereof may be subjected to surface treatment with a silane coupling agent or the like.

In the present invention, the functional layer is calcined after being transferred, thereby turning to the functional layer exhibiting a higher function. The calcining is performed dependently on the kind of the functional fine particles, for example, in the atmosphere of air at about 250 to 2000° C., preferably about 350 to 1200° C. At this time, the heat-resistant temperature of the object article on which the layer is transferred is considered. For example, the functional layer may be calcined at a relatively low temperature of about 250 to 600° C., and subsequently calcined at a higher temperature.

The heat treatment at high temperature makes high the filling rate of the functional fine particles in the functional layer and further accompanies sintering, thereby yielding a higher function.

The functional layer in the functional film for transfer is impregnated with a part of the adhesive, and the impregnated adhesive is cured by curing treatment. The organic components such as acrylic type components are extinguished by the calcining. On the other hand, the silicone resin components are calcined, thereby becoming silicon dioxide or a silicon dioxide analogue having, in partial Si, organic residues. In this way, at the time of the calcining, the resin undergoes volume shrinkage. The shrinkage force makes the filling rate of the functional fine particles high. If the calcining temperature is high, neck-growth of the functional fine particles is caused so that the filling rate becomes higher. In the case of a conductive layer, the filling rate of the conductive fine particles is made high by the volume shrinkage of the resin so that the contact of the conductive fine particles with each other gets strong, whereby the electric resistance becomes lower than before the calcining. If the calcining temperature is higher, neck-growth of the conductive fine particles is caused so that the filling rate becomes higher and the electric resistance becomes lower.

Since the adhesive layer of the functional film for transfer according to the present invention or the adhesive layer provided beforehand on the object article comprises the silicone type resin (S), sure adhesion between the functional layer and the surface of the object article to be transferred can be maintained even by the high-temperature calcining. In other words, the organic components, such as the acrylic type components, in the adhesive layer are extinguished by the calcining while the silicone resin components become silicon dioxide or a silicon dioxide analogue having, in partial Si, organic residues. Silicon dioxide or the silicon dioxide analogue is a substantially inorganic material and has a high melting point, and is a solid even in an environment having a considerably high temperature. Thus, silicon dioxide or the silicon dioxide analogue remains between the functional layer and the object article. Therefore, the sure adhesion therebetween can be maintained.

Since the functional layer is a compressed layer of functional fine particles, the surface of the functional layer has concave-convex when the surface is very microscopically viewed. In the case that the amount of the silicone type resin in the adhesive layer is small, the adhesive layer can be made very thin after the calcining. For this reason, convex portions of the functional layer surface can be brought into contact with the object article. On the other hand, in the case that the amount of the silicone type resin in the adhesive layer is made large, the adhesive layer becomes thick after the calcining. For example, the diffusion of sodium ions from glass (the object article) to the functional layer can be prevented.

In the present invention, inorganic fine particles may be incorporated into the adhesive layer. For example, there is a case in which a titanium oxide layer is transferred through the adhesive layer onto the conductive layer of ITO to be formed thereon, whereby the ITO conductive layer and the titanium oxide layer are desired to be electrically connected with each other. In such a case, one or more of fine particles such as ITO fine particles and titanium oxide fine particles are incorporated into the adhesive layer, whereby electric connection between the ITO conductive layer and the titanium oxide layer can be obtained even if the adhesive layer is relatively thick.

In the case that the amount of the silicon type resin in the adhesive layer is small, the amount of the silicone type resin which impregnates the functional layer is also smaller and pores in the functional layer after the calcining are also bigger than the case that the amount is large. After the calcining, the pores may be separately impregnated with a resin or the like. In the case of a transparent conductive layer, a transparent substance impregnates after calcining, thereby lowering scattering, that is, improving the haze thereof.

After the calcining, annealing treatment is preferably performed. The annealing treatment may be performed by putting the layer-transferred and calcined object article into, for example, a reduced pressure at 200 to 300° C. or a nitrogen atmosphere or hydrogen atmosphere at 200 to 700° C. The annealing treatment causes the state of oxygen deficiency. Thus, the electric resistance value becomes lower in the case of the conductive layer.

As described above, it is possible to form an article having on a surface thereof an adhesive layer made mainly of silicon dioxide and having on the adhesive layer a compressed layer of functional fine particles wherein the compressed layer is calcined.

In a modified example, instead of the functional film for transfer according to the present invention wherein the adhesive layer (5) is provided, the very same functional film for transfer except that no adhesive layer is provided may be used. In this case, the same adhesive as used in the adhesive layer (5) is applied in advance onto a surface of an object article to be furnished with a functional layer, and the functional layer is transferred through the adhesive layer provided in advance on the article surface, and is calcined.

EXAMPLES

Hereafter, the present invention will be described with reference to Examples thereof; however, the present invention is not limited to these Examples alone.

Example 1

A conductive film for transfer of the second type having, on a support (1), a resin layer (3), a conductive layer (4) and an adhesive layer (5) in this order was produced, as illustrated in FIG. 3.

(Formation of Hard Resin Layer)

A PET film (1) having a thickness of 75 μm (HSL, produced by Teijin Dupont Films Ltd.) was subjected to corona treatment so that the contact angle thereof with pure water was made into 39°. 100 parts by weight of an A solution of FRESCERA. N (produced by Matsushita Electric Industrial Co., Ltd.) were mixed with 300 parts by weight of a B solution thereof to prepare a coating solution for a resin layer. The coating solution was applied onto the corona-treated surface of the PET film (1), dried and cured at 90° C. for 24 hours to form a silicone resin layer (3) having a thickness of 1 μm.

(Formation of Conductive Layer)

To 100 parts by weight of ITO fine particles, SUFP-HX (produced by Sumitomo Metal Mining Co., Ltd.) having a primary particle diameter of 5 to 30 nm were added 300 parts by weight of ethanol, and dispersion was performed with a disperser using zirconia beads as media. The resultant coating solution was applied onto the resin layer (3) with a bar coater, and then hot wind of 50° C. was sent so as to dry the layer. The resultant film will be referred to as the ITO film before compression hereinafter. The thickness of the ITO-containing coating film was 1.7 μm.

First, a preliminary experiment was made in order to check compression pressure.

A roll press provided with a pair of metal rolls having a diameter of 140 mm (the surface of the roll being subjected to hard chromium plating treatment) was used to sandwich the ITO film before compression and to compress the film at room temperature (23° C.) without rotating the rolls and heating the rolls. At this time, the pressure per unit length in the direction of the film width was 660 N/mm. Next, the pressure was released and the length of the compressed portion in the direction of the film length was examined. As a result, the length was 1.9 mm. This results demonstrates that a compressing pressure of 347 $N/mm^2$ was applied per unit area.

Next, the same ITO film before compression as used in the preliminary experiment was sandwiched between metal rolls, and then the film was compressed under the above-mentioned conditions. The rolls were rotated so as to compress the film at a feed speed of 5 m/minute. In this way, the compressed ITO film was produced. The thickness of the ITO compressed layer, that is, the conductive layer (4) was 1.0 μm.

(Formation of Adhesive Layer)

100 parts by weight of a B solution of FRESCERA N (produced by Matsushita Electric Industrial Co., Ltd.) was put into a vat made of stainless steel to vaporize the solvent therein, thereby obtaining 17 parts by weight of a silicone resin. Thereto were added 22.5 parts by weight of toluene to obtain a silicone resin solution. To 98 parts by weight of an acrylic type resin 103 B (Tg: about 40° C., solid concentration: 50% by weight, produced by Taisei Chemical Industries Ltd.) were added 50 parts by weight of an ultraviolet curable type resin SD-318 (produced by Dainippon Ink & Chemicals, Inc.), 2.5 parts by weight of the silicone resin solution, and 183 parts by weight of methyl ethyl ketone, so as to prepare a coating solution for adhesive layer. The coating solution was applied onto the compressed film (4) of the ITO film and dried to form an adhesive layer (5) having a thickness of 4 μm. When the adhesive layer (5) was fingered, tackiness was felt. In this way, a conductive film for transfer was obtained.

(Transfer of Conductive Layer onto Glass Plate)

First, an object glass plate was subjected to surface treatment. To 100 parts by weight of a silane coupling agent KBM 503 (produced by Shin-Etsu Chemical Co., Ltd.) were added 0.9 part by weight of acetic acid (1 N) and 21 parts by weight of water to hydrolyze. To 1 part by weight of the hydrolyzed silane coupling agent solution were added 100 parts by weight of ethanol to prepare a surface treatment solution. A cotton swab was used to apply the surface treatment solution onto the glass plate and, the resultant was dried. The glass plate was put into the atmosphere of 110° C. for 5 minutes to cause the silane coupling agent to react with the glass. Thereafter, an excess of the silane coupling agent on the glass plate was wiped with a cloth into which ethanol was incorporated.

Next, the resultant conductive film for transfer was stuck by means of a laminator so as to bring the adhesive layer (5) into contact with the surface-treated glass plate. The ultraviolet rays were irradiated to cure the adhesive layer (5). After the curing, the support PET film (1) was released. The adhesive layer (5) was very strong.

(Calcining after Transfer)

After the curing, the glass plate furnished with the conductive layer (4) was put in the atmosphere of 500° C. air for 1 hour to burn organic components in the adhesive layer (5). Thereafter, the temperature of the atmosphere was lowered to 200° C. over 2 hours. Next, the glass plate was put into the atmosphere under a reduced pressure (0.1 atm) at 200° C., and the temperature was lowered to 50° C. over 5 hours. The glass plate was taken out and the temperature was lowered to room temperature (23° C.). The adhesive layer (5) was very strong after the curing also. In this way, the conductive layer (4) was given through the adhesive layer (5) onto the glass plate (6), as illustrated in FIG. 4.

(Electric Resistance)

A non-contact type resistance measuring device (MODEL 717B, produced by Coper Electronics Co., Ltd.) was used to measure the. electric resistance of the conductive layer (4). As a result, it was 100 Ω/□.

Example 2

A conductive film for transfer was obtained in the same way as in Example 1 except that the composition of the coating solution for adhesive layer was made as follows:

acrylic type resin 103B: 90 parts by weight, ultraviolet curable resin SD-318: 50 parts by weight, the above-mentioned silicone resin solution: 12.5 parts by weight, and methyl ethyl ketone: 181 parts by weight.

When the adhesive layer of the resultant conductive film for transfer was fingered, tackiness was felt. The resultant conductive film for transfer was used to transfer the conductive layer onto a glass plate and the calcining was performed in the same way as in Example 1. The adhesive layer (5) was very strong after the curing also. The electric resistance of the conductive layer (4) was 100 Ω/□.

Example 3

A conductive film for transfer was obtained in the same way as in Example 1 except that the composition of the coating solution for adhesive layer was made as follows:

acrylic type resin 103B: 80 parts by weight, ultraviolet curable resin SD-3 18: 50 parts by weight, the above-mentioned silicone resin solution: 25 parts by weight, and methyl ethyl ketone: 178 parts by weight.

When the adhesive layer of the resultant conductive film for transfer was fingered, tackiness was felt. The resultant conductive film for transfer was used to transfer the conductive layer onto a glass plate and the calcining was performed in the same way as in Example 1. The adhesive layer (5) was very strong after the curing also. The electric resistance of the conductive layer (4) was 100 Ω/□.

Example 4

The same conductive film for transfer as used in Example 1 was used to transfer the conductive layer onto a glass plate in the same way as in Example 1. After the adhesive layer (5) was cured, the glass plate furnished with the conductive layer (4) was put in the atmosphere of 500° C. air for 1 hour to burn organic components in the adhesive layer (5). Thereafter, in a nitrogen atmosphere of 500° C., the temperature of the atmosphere was lowered to 40° C. over 3 hours. The glass plate was taken out and the temperature was lowered to room temperature (23° C.). The adhesive layer (5) was very strong after the curing also. The electric resistance of the conductive layer (4) was 100 Ω/□.

Comparative Example 1

A conductive film for transfer was obtained in the same way as in Example 1 except that no silicone resin solution was added to the coating solution for adhasive layer. When the adhesive layer of the resultant conductive film for transfer was fingered, tackiness was felt. The resultant conductive film for transfer was used to transfer the conductive layer onto a glass plate and the calcining was performed in the same way as in Example 1. Before the calcining, the adhesive layer was very strong. However, after the calcining, the adhesive layer became extinct so that the conductive layer was released from the glass plate.

Comparative Example 2

A conductive film for transfer was obtained in the same way as in Example 1 except that no compressing operation was performed. The resultant conductive film for transfer was used to transfer the conductive layer onto a glass plate and calcining was performed in the same way as in Example 1. The adhesive layer (5) was very strong after the calcining also. The electric resistance of the conductive layer (4) was 500 Ω/□.

Comparative Example 3

The same conductive film for transfer as used in Example 1 was used to transfer the conductive layer onto a glass plate in the same way as in Example 1. However, no calcining was performed after the transferring. The adhesive layer (5) was very strong. The electric resistance of the conductive layer (4) was 250 Ω/□.

Example 5

In this Example, the same conductive film for transfer as used in Example 1 and a titanium oxide film for transfer, which was obtained as will be described below, were used to form a conductive layer and a titanium oxide layer on an object glass. This Example is an example wherein an electrode for a wet solar cell (Graetzel cell) was supposed.

The titanium oxide film for transfer having, on a support, a resin layer and a titanium oxide compressed layer in this order was formed.

(Formation of Hard Resin Layer)

A PET film having a thickness of 75 μm (HSL, produced by Teijin Dupont Films Ltd.) was subjected to corona treatment so that the contact angle thereof with pure water was made into 39°. 100 parts by weight of an A solution of FRESCERA N (produced by Matsushita Electric Industrial Co., Ltd.) were mixed with 300 parts by weight of a B solution thereof to prepare a coating solution for resin layer.

The coating solution was applied onto the corona-treated surface of the PET film, dried and cured at 90° C. for 24 hours to form a silicone resin layer having a thickness of 1 μm.

(Formation of Titanium Oxide Compressed Layer)

To 100 parts by weight of titanium oxide fine particles having a primary particle diameter of 5 to 40 nm were added 900 parts by weight of ethanol, and dispersion was performed in a disperser using zirconia beads as media. The resultant coating solution was applied onto the resin layer with a bar coater, and then hot wind of 50° C. was sent so as to dry the layer. The thickness of the titanium oxide-containing coating film before the compression was 2.6 μm. This titanium oxide-containing coating film was compressed at a pressure of 330 N/mm as a pressure per unit length in the direction of the film width (183 N/mm$^2$ as a pressure per unit area), so as to obtain a titanium oxide compressed layer. The thickness of the titanium oxide compressed layer was 1.5 μm. In this way, a titanium oxide film for transfer was obtained.

(Transfer of Conductive Layer onto Glass Plate, and Calcining)

The same conductive film for transfer as used in Example 1 was used to transfer the conductive layer onto a glass plate (6) in the same way as in Example 1. After the adhesive layer (5) was cured, the glass plate furnished with the conductive layer (4) was put in the atmosphere of 500° C. air for 1 hour to burn organic components in the adhesive layer (5). Thereafter, the temperature of the atmosphere was lowered to take out the glass plate. The adhesive layer (5) was very strong after the curing also.

(Adhesive Coating Solution)

Acrylic resin 103B: 96 parts by weight

Ultraviolet curable resin SD-318: 50 parts by weight

The same silicone resin solution used in Example 1: 5 parts by weight

Methyl ethyl ketone: 182 parts by weight.

(Transfer of Titanium Oxide Layer onto Conductive Layer, and Calcining)

The adhesive coating solution having the above-mentioned composition was applied onto the ITO conductive layer (4) on the glass plate (6), and then was dried. Next, the titanium oxide film for transfer was stuck by means of a laminator so as to bring the titanium oxide compressed layer (14) into contact with the adhesive layer (15). Ultraviolet rays were radiated onto the laminate from its glass face side to cure the adhesive layer (15). After the curing, the support PET film was released. After the curing, the glass plate (6) furnished with the conductive layer (4) and the titanium oxide layer (14) was calcined in air at 500° C. for 1 hour, and then the temperature of the atmosphere was lowered to 200° C. over 2 hours. Next, the glass plate was put into the atmosphere under a reduced pressure (0.1 atm) at 200° C., and the temperature was lowered to 50° C. over 5 hours. The glass plate was taken out and the temperature was lowered to room temperature (23° C.). In this way, the conductive layer (4) was given through the adhesive layer (5) onto the glass plate (6), and further the titanium oxide layer (14) was given through the adhesive layer (15). The application of the adhesive coating solution and the transfer of the titanium oxide layer onto the ITO conductive layer were not conducted onto the whole of the ITO conductive layer, so that a partial surface of the ITO conductive layer was exposed. See FIG. 6(*b*).

(Measurement of Electric Resistance)

Figure 6:
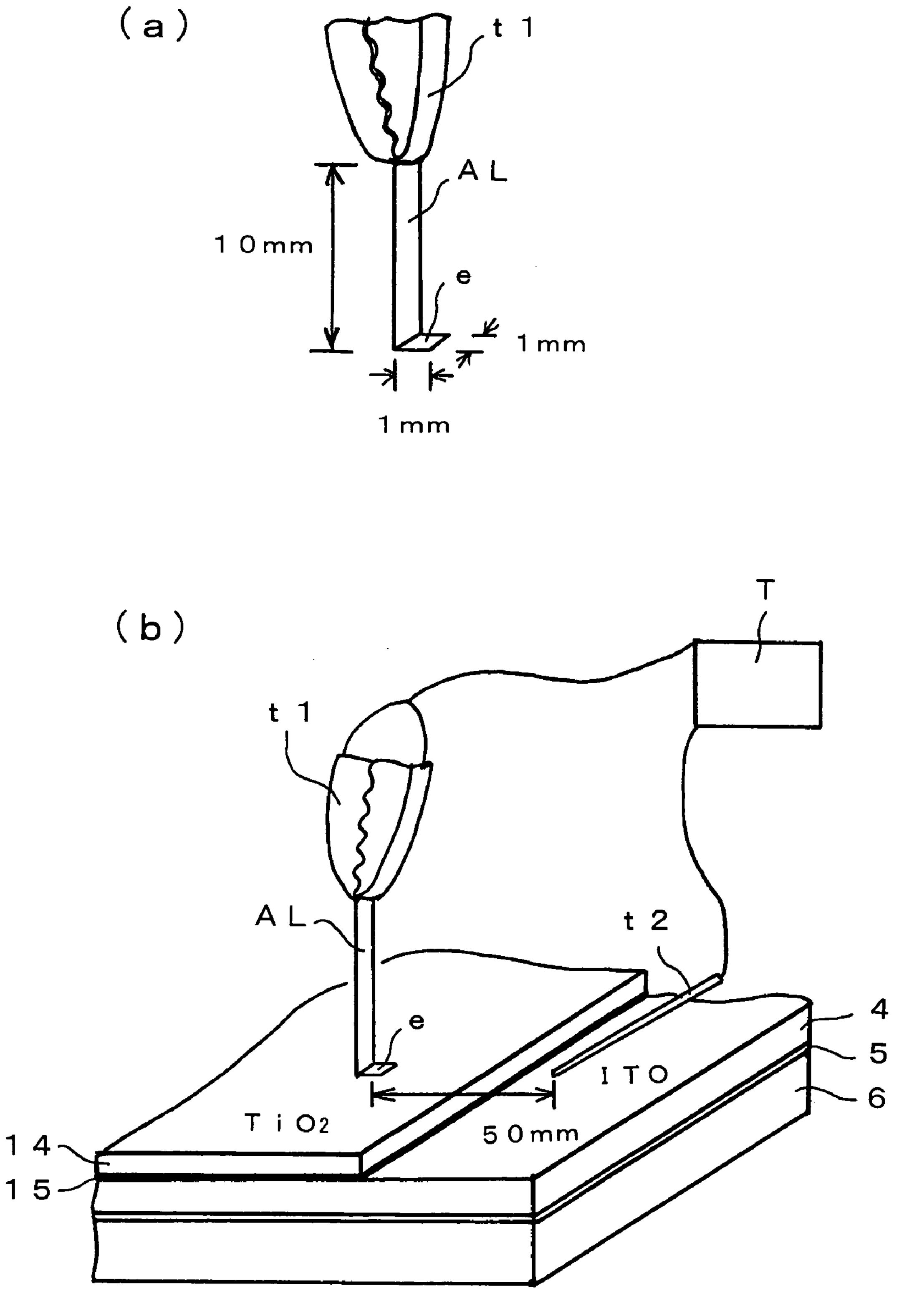
FIG. 6 is a view for describing measurement of electric resistance in Example 5.

Description will be given with reference to FIG. 6.

A tester (T) having two terminals was prepared, and one of the terminals was formed into an alligator clip (t1). An aluminum foil having a thickness of 20 μm was cut into a rectangle of 1 mm in width and 15 mm in length (AL). The rectangle was perpendicularly folded at a position of 1 mm from one of ends thereof in the longitudinal direction, so as to form a cubic end (e) 1 mm square. The aluminum foil (AL) was sandwiched, at a position of 4 mm from the other end thereof in the longitudinal direction, with the alligator clip (t1). See FIG. 6(*a*).

The other terminal (t2), which was not any alligator clip, was put onto the exposed portion of the ITO conductive layer (4), and the cubic end (e) of the aluminum foil (AL), sandwiched with the alligator clip (t1), was put onto the surface of the titanium oxide layer (14) 50 mm apart from the position where the other terminal was put, so as to bring the cubic surface into contact with the titanium oxide layer (14). In this state, the electric resistance was measured. See FIG. 6(*b*). The electric resistance was 300 MΩ/□. Thus, electric contact was attained between the titanium oxide layer (14) and the ITO conductive layer (4).

In the Examples, examples wherein ITO fine particles were used as inorganic fine particles to produce a functional film for transfer having a transparent conductive layer and the conductive layer was given to a glass plate have been shown. In the same way as in the Examples, inorganic fine particles having various natures are used to make it possible to form functional films for transfer having various inorganic functional layers. Of course, as object articles, various articles to each of which a functional layer needs to be given may be selected. Therefore, the above-mentioned Examples are merely illustrative of the present invention in all points, and the present invention should not be restrictedly interpreted. Furthermore, all modifications belonging to a scope equivalent to the claims are included in the scope of the present invention.

INDUSTRIAL APPLICABILITY

According to the present invention, simple operations of application and compression can give a functional film for transfer having a functional layer excellent in performance and having an adhesive layer having excellent adhesion performance even if the adhesive layer is subjected to high-temperature treatment. According to the present invention, the functional film for transfer is used to transfer onto a surface of an object article and subsequently the calcining is performed, thereby forming a functional layer having a higher function certainly. The present invention is particularly advantageous for a case in which an article poor in flexibility, such as a board material, is furnished with a functional layer having a uniform thickness.

The present invention can be applied to the formation of various functional layers on object surfaces. It is particularly preferable that the present invention is applied to the formation of a transparent conductive layer.

The invention claimed is:

1. A method for producing an article furnished with a functional layer, comprising adhering a functional film for transfer to the article, said functional film for transfer comprising at least a functional layer on a support, and an adhesive layer on the functional layer, said functional layer being releasable from the support, wherein the functional layer is a compressed layer of functional fine particles, and the adhesive layer comprises at least an acrylic monomer (M) and a silicone resin (S), wherein the adhesive layer of the film adheres to a surface of the article; curing the adhesive layer after the adhering; releasing the support; and subsequently calcining the compressed layer.

2. The method according to claim 1, wherein the adhesive layer further comprises an acrylic resin (P).

3. The method according to claim 1, wherein the adhesive layer comprises the acrylic resin (P) and the acrylic monomer (M) at a weight ratio P/M of 0/10 to 8/2, and comprises the silicone resin (S) at a weight ratio of the silicone resin (S) to the total (P+M) of the acrylic resin (P) and the acrylic monomer (M), S/(P+M), of 0.01/100 to 50,000/100.

4. The method according to claim 1, wherein the compressed layer of the functional fine particles is obtained by compressing a functional fine particle-containing layer, said functional fine particle-containing layer being formed by adhering a liquid in which the functional fine particles are dispersed onto the support or an intermediate layer, and drying.

5. The method according to claim 1, wherein the compressed layer of the functional fine particles is obtained by compressing at a compression force of 44 $N/mm^2$ or more.

6. The method according to claim 1, wherein the functional fine particles are conductive fine particles, and the compressed layer of the functional fine particles is a conductive layer.

7. A method for producing an article furnished with a functional layer, comprising:

preparing a functional film for transfer comprising at least a functional layer on a support, said functional layer being releasable from the support and being a compressed layer of functional, fine particles;

providing an adhesive layer comprising at least an acrylic monomer (M) and a silicone resin (S) on a surface of an object article to be furnished with the functional layer;

adhering the functional film for transfer, to the adhesive layer so as to position the support outside, curing the adhesive layer after the adhering, releasing the support, and subsequently calcining the compressed layer.

* * * * *